United States Patent [19]

Garner

[11] 3,917,028
[45] Nov. 4, 1975

[54] LUBRICATION RESERVOIR ASSEMBLY

[75] Inventor: Lloyd L. Garner, Los Alamitos, Calif.

[73] Assignee: Smith International, Inc., Newport Beach, Calif.

[22] Filed: Jan. 13, 1975

[21] Appl. No.: 540,316

[52] U.S. Cl. ............................. 184/6.14; 175/228
[51] Int. Cl.$^2$ .......................................... E21B 9/08
[58] Field of Search ............... 175/227, 228, 229; 308/8.2; 184/1 R, 6, 6.14, 88 R, 88 A, 89

[56] References Cited
UNITED STATES PATENTS

| | | | |
|---|---|---|---|
| 3,230,019 | 1/1966 | Kotch | 175/228 |
| 3,230,020 | 1/1966 | Gilbert | 175/228 |
| 3,476,195 | 11/1969 | Galle | 175/228 |
| 3,765,495 | 10/1973 | Murdoch | 175/228 |
| 3,847,234 | 11/1974 | Schomacher | 175/228 |

Primary Examiner—Richard C. Pinkham
Assistant Examiner—Marvin Siskind

[57] ABSTRACT

A drill bit construction with a lubrication system for the rotary cutter means thereof which includes a lubricant reservoir having lubricant in flow communication with the bearing area of said rotary cutter means, the lubricant reservoir having a permanent closure plug removably mounted within the entrance to the reservoir and a temporary closure plug removably mounted within the entrance to the reservoir in place of the permanent plug when the reservoir is filled with lubricant whereby when so filled and the permanent plug mounted in place of the temporary plug, an expansion space is provided between the lubricant in the reservoir and the inner side of the permanent plug.

5 Claims, 3 Drawing Figures

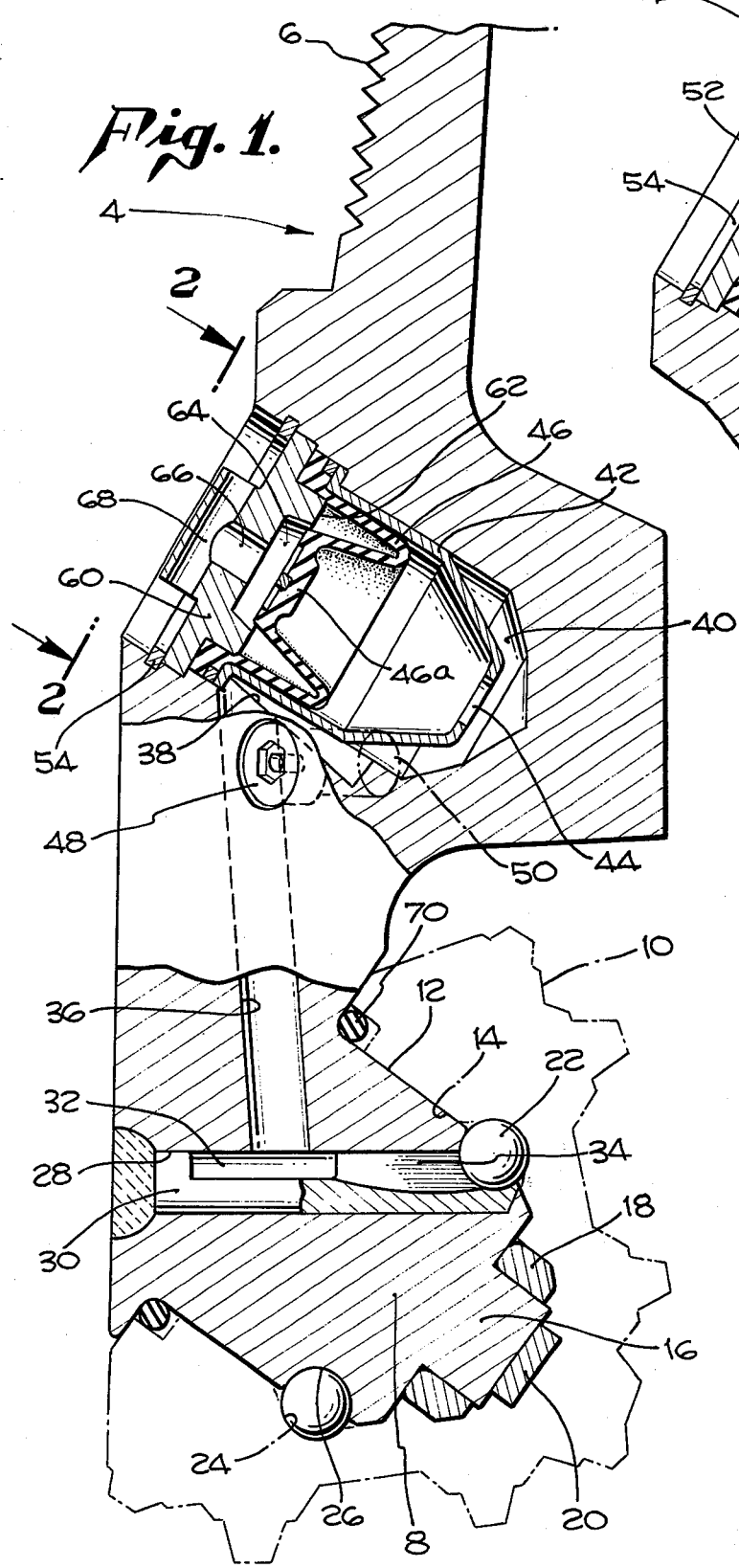
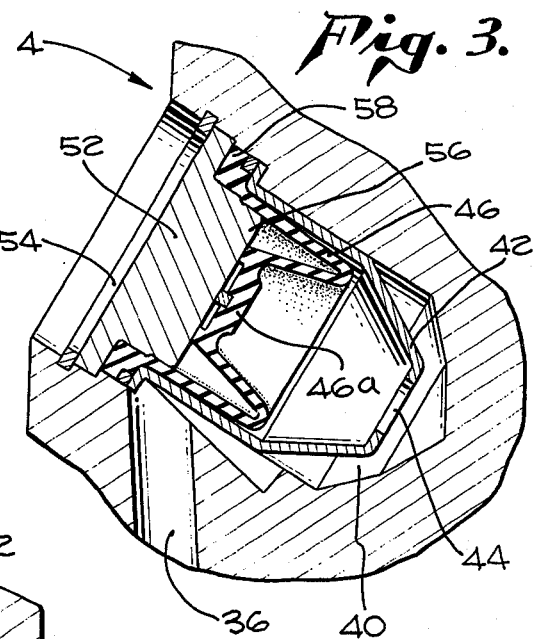
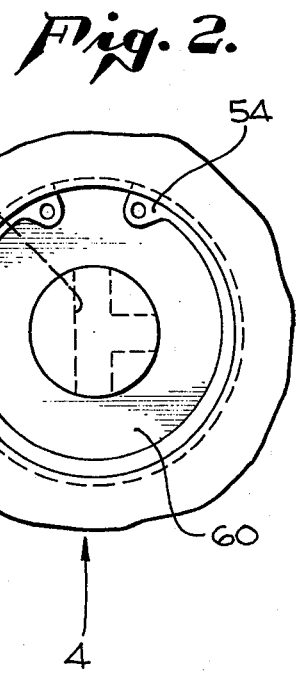

LUBRICATION RESERVOIR ASSEMBLY

DISCLOSURE

Drill bits for earth boring purposes, and particularly rock bits, generally comprise a bit body having one or more journal legs, each supporting a rotary rock cutter. One such drill bit is known as a friction journal bit wherein the cutter rotates upon the journal leg as a bearing. Another type is known as a roller cutter bit and includes roller bearings. Both types normally are provided with ball bearings in opposed semi-circular grooves on the cutter and on the leg journal, the ball bearings being inserted and retained in such a way that the cone cutter is held against axial movement on the leg journal.

Suitable lubrication means is provided for these bits and generally they include a reservoir for lubricant which is in communication with the bearing area or space between the rotary cutter and the leg journal. The reservoir is conventionally filled with lubricant through a port extending from outside the tool to the interior of the reservoir. When the reservoir is filled this port can be closed by welding or constructed to removably receive a pressure relief valve which is adapted to relieve excessive pressures within the lubrication system and prevent damage to seals such as O-ring seals located between the rotary cutter and the leg journal.

The lubricant reservoir may conveniently be provided with a flexible boot or diaphragm so that when the lubricant is introduced into the reservoir it engages the inner side of the flexible boot. The outer side of the boot is provided with a port which will admit pressurized drilling fluid such as is customarily used so that the pressure of the drilling fluid on the outside of the tool body is transmitted to the lubricant by the flexible boot or diaphragm and this pressure is transmitted through the lubrication system between the rotary cutter and the leg journal. The pressure is also exerted upon the O-ring or seal between the cutter and the leg journal, the opposite side of the seal being subjected to the ambient pressure of the drilling fluid. Since the flexible boot in the lubricant reservoir transmits the drilling pressures to the lubricant so that the pressures on both sides of the boot are approximately equalized, the flexible boot is generally termed a pressure compensator.

In the operation of the drilling bits of the type disclosed herein, the lubricant is subjected to considerable pressure reflected by the pressure of the drilling fluid. It is also subjected to pressure in the bearing areas because of the considerable weight imposed upon the tool in operation; for example, the string of drill pipe to which the tool is attached may, depending upon the depth of the hole and the bit size, exert a force as great as 40,000 lbs. Also, the lubricant is subjected to heat generated by friction in the bearing as well as that created by the action of the teeth of the rotary cutter on the rock formation being drilled. As a result, during boring operations and/or tripping the bit, certain of the more volatile fractions of the petroleum base lubricant are "cracked" or converted into pressurized vapor in the lubrication system. If the pressure gets too great, it is possible that the flexible boot will be ruptured or the O-ring seal between the rotary cutter and the journal leg may be extruded or otherwise damaged.

It is possible to relieve excessive pressures in the lubrication system with a pressure relief valve. The present invention, however, has as its object the provision of an expansion space in the lubricant reservoir so that increases in pressure within reasonable limits are compensated for without the use of a pressure relief valve, or without causing such a valve, when used, to open too frequently and permit the escape of lubricant.

The above objects and advantages of the invention will more fully appear from the following detailed description in connection with the accompanying drawing:

FIG. 1 is a longitudinal vertical sectional view through a portion of a drill bit body with a rotary cone cutter shown in broken lines;

FIG. 2 is a plan view of a drill showing the permanent closure plug with its retaining ring;

FIG. 3 is a fragmentary sectional detail showing the lubricant reservoir with the temporary closure plug therein.

The drawing shows a drill bit body 4 having drill pipe attachment threads 6 at its upper end. At the bottom of the bit body is a downwardly and inwardly extending journal leg 8 having a conventional rotary cutter 10 mounted for rotation thereon. The journal leg has a cylindrical bearing surface 12 upon which the cutter 10 rotates, the latter being provided with an internal cylindrical bearing surface 14. Conventionally the lower end of the journal leg 8 is reduced as at 16 and a hard metal bearing 18 is mounted in the rotary cutter 10 and lies about the journal leg reduction 16. A thrust button 20 lies between the extreme end of the journal leg 8 and the inner end of the rotary cutter 10. As is well known in the art the bit may be provided with ball bearings 22 lying in complementary race portions 24 and 26 in the cutter and journal leg respectively. The ball bearings are initially inserted through a passage 28 in the leg journal, the passage being provided with a closure plug 30 having grooves 32 and 34 leading to the bearing area from a lubricant supply passage 36 in the bit body.

The lubricant passage 36 has an inlet 38 which communicates with a lubricant reservoir 40 in the bit body. This reservoir is provided with a metal sleeve 42 whose lower end has a lubricant flow outlet 44.

Located within the sleeve 42 is a flexible boot or diaphragm 46. Lubricant is injected into the reservoir 40 and also into the sleeve 42 beneath the boot or diaphragm 46. This is accomplished through an opening which provides communication from the exterior of the tool to the lower inner portion of the lubricant reservoir at the port 50, through filler plug 48.

When lubricant is introduced into the reservoir 40 the otherwise open end of the temporary cap 52 is held in place by a resilient locking ring 54. The temporary closure plug or cap is shown with an inner end surface 56 which extends some distance inwardly relative to the upper end 58 of the flexible boot 46. When lubricant is pumped into the reservoir 40 it will pass up through the port 44 in the bottom of the metal sleeve 42 and press the central portion 46A of the boot against the underside 56 of the temporary plug or cap 52.

When the lubricant reservoir has been thus filled, the snap ring 54 is removed and the temporary cap or plug 52 is also removed from the open upper end of said reservoir 40. In place of the cap 52 is inserted a removable permanent cap 60 which is held in place by the snap ring 54. However, it should be noted that the bottom surface of the permanent cap 60 does not extend into the lubricant reservoir 40 nearly as great a distance as the bottom surface 56 of the temporary cap 52. The underside 62 of the permanent cap 60 is also relieved as shown at 64 so that there is a lubricant-free space between the upper side of the flexible boot 46 and the bottom portions of the permanent cap 60. A port 66 extends upwardly from the relieved underside 64 of the permanent cap 60. A cross port 68 provides communication between the upper end port 66 and the outside of the tool.

When the drill bit is lowered into the hole being drilled and drilling fluid such as mud is pumped down into the hole around the drill string and body 4, a certain amount of the drilling mud will enter ports 68 and 66 but a quantity of air will be entrapped between the drilling mud and the boot 46. Furthermore, internal lubricant pressure against the underside of the boot 46 can cause it to move upwardly from its position in FIG. 3 to the position in FIG. 1. Thus, there is an expansion space provided which will at least partially, if not entirely, relieve vaporized lubricant pressure buildup in the lubrication system and consequently prevent damage of the flexible boot 46 and also, of the O-ring seal 70 which is commonly used between the upper inner portion of the rotary cutter 10 and the upper cylindrical portion 12 of the leg journal 8.

As stated above the provision of an expansion space through the use of the deeper temporary cover cap 52 can of itself compensate for increases in volatilized lubricant pressure, but I have decided, to relieve extreme pressure conditions, a high pressure relief valve can be used in place of the filler plug 48.

It should, of course, be understood that various changes can be made in the form, details, arrangement and proportions of the various parts without departure from the spirit of the invention.

What is claimed is:

1. In a lubrication system for earth boring tools wherein the body of the tool has a reservoir for a lubricant, a journal leg, a rotary cutter on said journal leg and defining therewith a lubrication space having a lubricant connection with said reservoir, an expansion device in said reservoir, a permanent removable closure plug for said reservoir extending a given distance into the reservoir, and a temporary closure plug for the reservoir in place of the permanent plug and extending into the reservoir a greater distance than the permanent plug so that when the permanent plug is substituted for the temporary plug the reservoir is provided with a lubricant product expansion space therein.

2. The structure in claim 1, and said tool body having a filler opening therein communicating with the interior of said reservoir, 3. The structure in claim 2, and said filler opening having a pressure relief valve removably located therein.

4. The structure in claim 1, and said reservoir having an opening to the outside of the tool, said closure plugs being selectively insertable in said opening, and means for releasably retaining the closure plugs in said opening.

5. The structure in claim 1, and said reservoir having an opening to the outside of the tool, said opening having an outwardly facing shoulder therein spaced inwardly from the outside thereof, said permanent closure plug being receivable in said opening and adapted to engage said shoulder, and said temporary plug being insertable in said opening and adapted to engage said shoulder and extending into said opening beyond said shoulder a greater distance than said permanent plug.

* * * * *